(12) United States Patent
Byrne

(10) Patent No.: US 7,989,738 B2
(45) Date of Patent: Aug. 2, 2011

(54) GROMMET ASSEMBLY FOR WARMING LIQUIDS ON WORK SURFACE

(76) Inventor: Norman R Byrne, Ada, MI (US)

( * ) Notice: Subject to any disclaimer, the term of this patent is extended or adjusted under 35 U.S.C. 154(b) by 1144 days.

(21) Appl. No.: 11/610,903

(22) Filed: Dec. 14, 2006

(65) Prior Publication Data

US 2008/0142504 A1 Jun. 19, 2008

(51) Int. Cl.
*H05B 3/68* (2006.01)
*H05B 3/06* (2006.01)
(52) U.S. Cl. .................................. 219/452.11; 219/537
(58) Field of Classification Search .... 219/432.1–468.2, 219/402–407, 415–424, 536, 537
See application file for complete search history.

(56) References Cited

U.S. PATENT DOCUMENTS

| | | | |
|---|---|---|---|
| 2,867,711 A * | 1/1959 | Fisher, Jr. et al. | 219/448.11 |
| 2,992,315 A * | 7/1961 | McDonnold | 219/453.15 |
| 4,747,788 A | 5/1988 | Byrne | |
| 5,351,173 A | 9/1994 | Byrne | |
| 5,575,668 A * | 11/1996 | Timmerman | 439/131 |
| 5,763,832 A * | 6/1998 | Anselm | 174/669 |
| 6,290,518 B1 | 9/2001 | Byrne | |
| 6,379,182 B1 | 4/2002 | Byrne | |

OTHER PUBLICATIONS

Tellurex Corporation, An Introduction to Thermoelectrics, 2006, pp. 1-7. Tellurex Corporation, Traverse City, Michigan.
Tellurex Z-Max Module Price List, May 17, 2006. Tellurex Corporation.
Tellurex Corporation, ZMAX Cooling Module Starter Kit for Prototypes or Just Plain Fun!, website, 2006, Tellurex Corporation.
Tellurex Corporation, Engineered Solutions: Great Engineering for Great Thermoelectrics, website, Tellurex Corporation.

* cited by examiner

*Primary Examiner* — Sang Y Paik
(74) *Attorney, Agent, or Firm* — Varnum LLP

(57) ABSTRACT

A liquid warming grommet assembly (400, 500) maintains liquids or other materials in a vessel (406) at a desired temperature. The grommet assembly (400, 500) includes a grommet (408) receivable within an aperture in a work surface (404). A heating element (440) is receivable within a casing (410) of the grommet (408), and an upper warmer plate (444) is positioned at the upper portion of the heating element (440) and is substantially flush with the work surface (404).

12 Claims, 15 Drawing Sheets

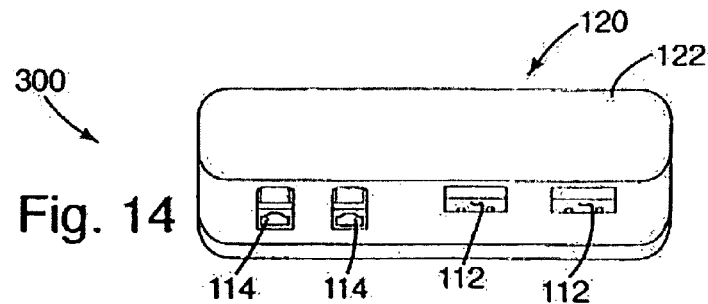
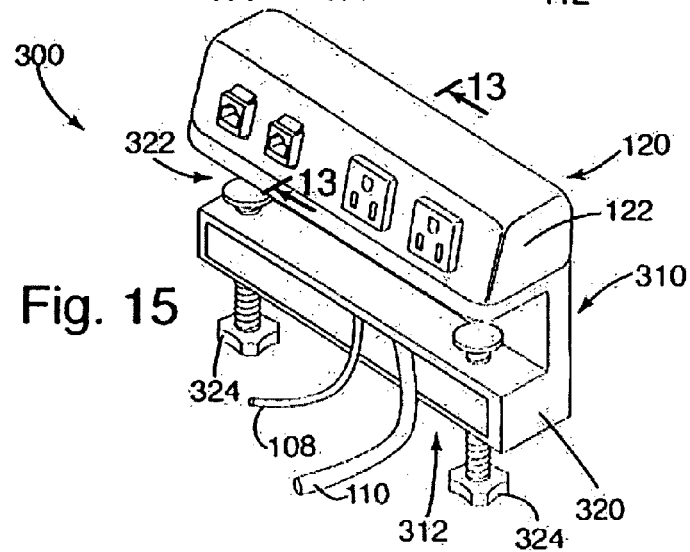
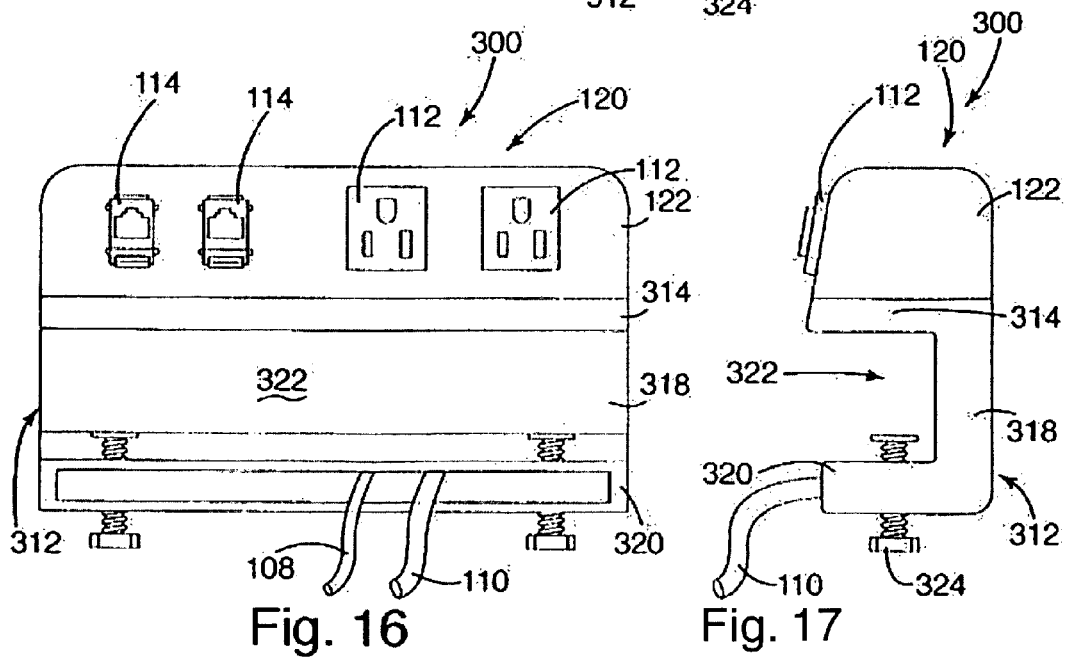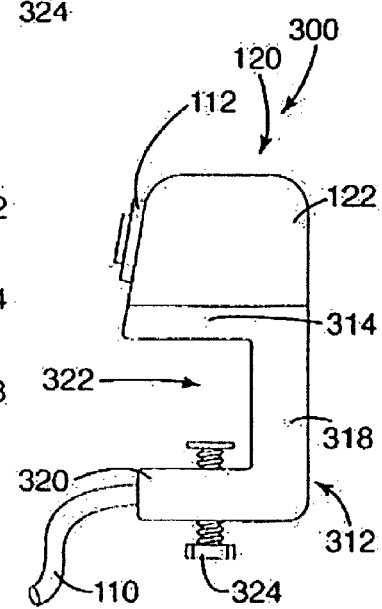

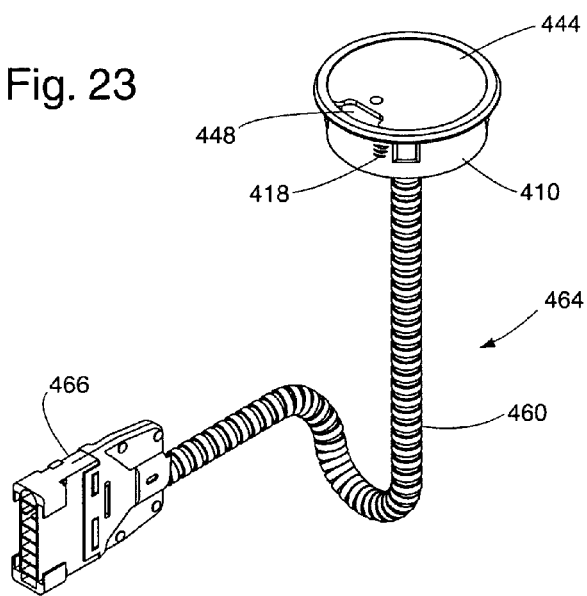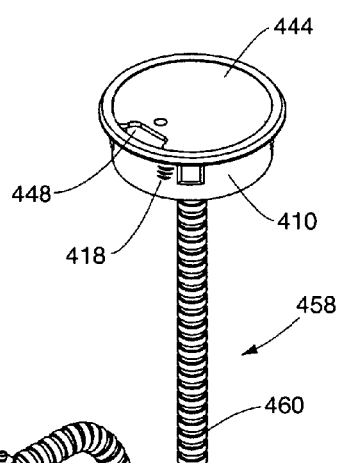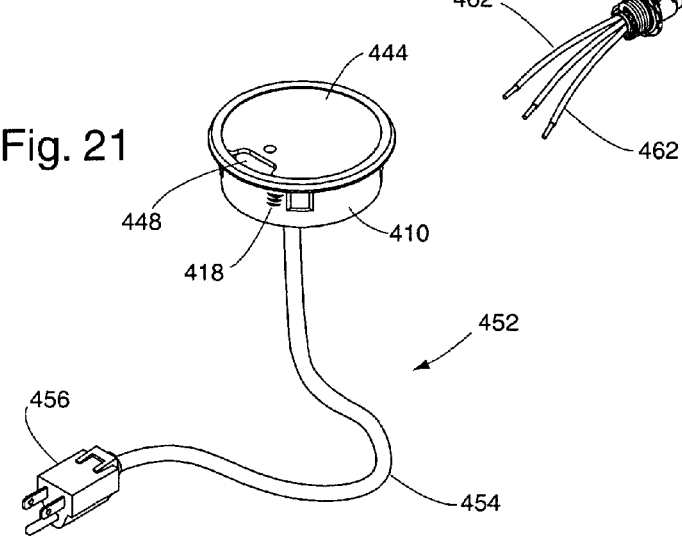

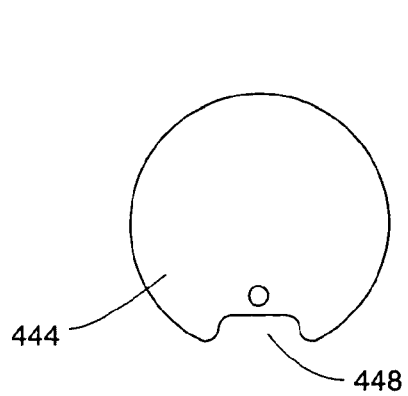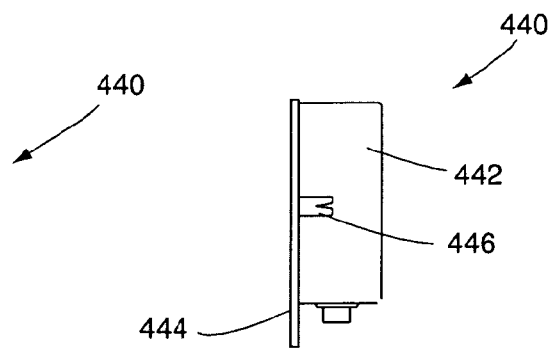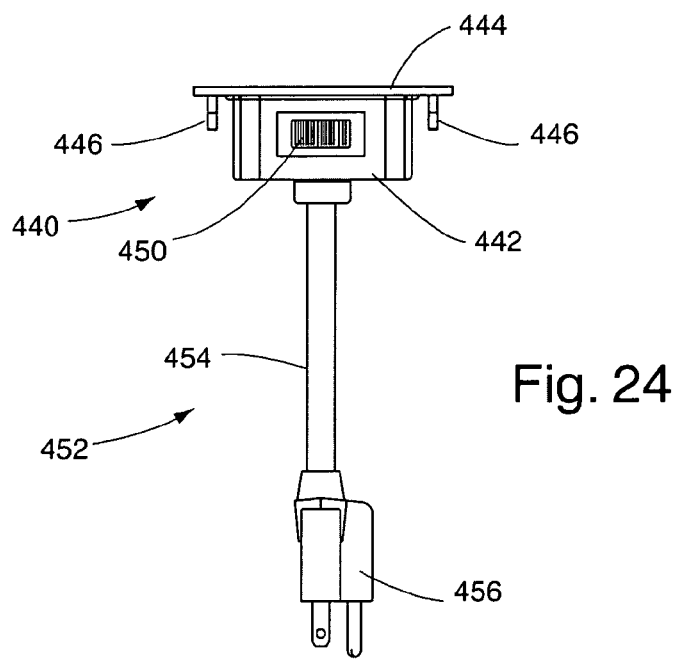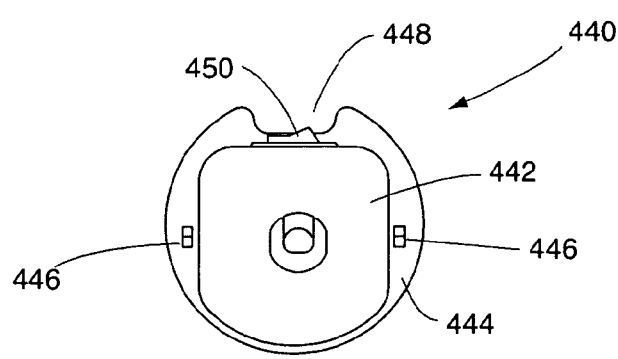
Fig. 25
Fig. 26
Fig. 24
Fig. 27

GROMMET ASSEMBLY FOR WARMING LIQUIDS ON WORK SURFACE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to devices for mounting on work surfaces and, more particularly, to assemblies for collectively warming liquids on the work surfaces.

2. Background Art

Efficient organization of devices requiring electrical power within an office, commercial, industrial or residential environment has been a historical problem. Such devices include lamps, typewriters and the like. More recently, this problem has been exacerbated by the proliferation of additional devices for communications, such as complex telephone stations, computers, video displays and the like. The primary problems associated with the efficient organization and use of such devices relate to the abundance of wiring arrays and the positioning of the energy-requiring devices within the environment, particularly in office environments.

The problems of convenience, efficiency and aesthetics have been addressed, to some extent, with respect to electrical receptacles and voice/data terminals. For example, it is known to mount electrical receptacles (and data terminals) on a work surface in a retractable manner, so that power cords and communication cables may easily be connected to the electrical receptacles and terminals above the work surface, but both the cords and receptacles may be retracted below the work surface while maintaining power and communications to the user devices.

One relatively substantial advance in the art relating to the mounting of electrical receptacles in a retractable manner in work surfaces and the like, is shown in the commonly owned U.S. Pat. No. 4,747,788 to Byrne issued May 31, 1988. In the Byrne patent, a retractable power center includes a retainer housing formed in the work surface, with a clamping arrangement to secure the housing to the work surface. A lower extrusion is connected to a lower portion of the housing, and a manually movable power carriage mounts receptacles. In response to manual application of upward forces on the power carriage, the carriage may be raised upward into an extended, open position. Small bosses extending from the sides of the carriage, resting on the top portion of the housing, support the carriage in the extended, open position. In the open position, the user can energize desired electrical devices from the receptacles, and then lower the carriage into a releasably secured, retractable position.

The Byrne '788 patent represents a substantial advance with respect to retractable power centers mounted on work surfaces and the like. In addition to the Byrne '788 patent, another relatively substantial advance in the art is disclosed in the commonly owned U.S. Pat. No. 5,351,173 to Byrne issued Sep. 27, 1994. In the Byrne '173 patent, a retractable communications terminal center includes voice/data terminals adapted to be mounted in a work surface. The communications terminal center includes a lighting arrangement for providing illumination in the vicinity of the energy center. A pivot arrangement is coupled to the lighting configuration and to the energy center power carriage so as to provide a positional adjustment of the lighting arrangement relative to the carriage.

In addition to retractable energy center configurations, it is known to provide for relatively stationery configurations which are extremely accessible to electrical and communication devices on the work surfaces. However, although such configurations normally are stationery, it has been found to be advantageous to provide for such energy centers to be adjustable as to their particular position on or around a work surface. A substantial advance in the art with respect to such energy center configuration is disclosed in the commonly owned U.S. Pat. No. 6,379,182 to Byrne issued Apr. 30, 2002. The Byrne '182 patent is described in substantial detail in subsequent paragraphs herein.

In addition to providing for work surface access to electrical receptacles and data terminals, it would be advantageous if such accessibility extended to other types of office applications. For example, one staple of almost all commercial, industrial and residential environments is the conventional coffee pot and hot water dispensers (for tea, chocolate or the like). Such coffee pot and water dispenser assemblies are utilized not only to brew liquids, but also to maintain their warmth. In this regard, however, after a user pours a cup of coffee or other liquid into a conventional cup, the liquid will cool relatively quickly. Often, such cooling occurs at a rate faster than the liquid is consumed by the user. When this occurs, the user is required to throw out the cooled coffee or other liquid, and refill the user's cup. This requires time and wasting of energy, since the user would typically have to walk from the user's work station to the coffee pot or hot water dispenser, and must also find a place to dispose of the cooled liquid. Accordingly, it would be advantageous if the user had means to maintain the coffee or other liquid at a desired, raised temperature, without requiring constant movement between typical coffee brewing assemblies and hot water dispensers, and the user's work station.

SUMMARY OF THE INVENTION

In accordance with the invention, a liquid warming grommet assembly is adapted for use in maintaining liquid or other materials in a vessel at a desired temperature. The grommet assembly is adapted to be mounted to a work table or other furniture item having a work surface. The assembly includes a grommet with a lower casing receivable within an aperture within the work surface. The grommet also includes an upper collar, with the casing forming a housing interior. The assembly also includes a heating element having a lower element housing adapted to be received within the housing interior. An upper warmer plate is provided above the lower element housing and is adapted to be positioned substantially flush with the work surface. Power connection means are connected to the heating element and are connectable to a source of electrical power, so as to energize the heating element.

In accordance with other aspects of the invention, the grommet assembly can include alignment slots positioned on interior surfaces of the casing. The heating element can correspondingly include element ears, with the ears being receivable within the alignment slots, so as to properly align the heating element with the grommet.

Still further, the grommet assembly can include press-fit ribs positioned on outer surfaces of the casing, so as to provide for a friction fit between the casing and the work table. The heating element can also include a power switch mounted to an outer surface of the element housing. A finger slot can be cut out of a portion of the warmer plate directly above the power switch, so that a user can access the power switch even when the heating element is received within the casing of the grommet.

In accordance with other aspects of the invention, the power connection means can include an electrical cord with a conventional multi-prong plug positioned at a distal end of the cord. Alternatively, the power connection means can comprise a hard wired configuration, with a flexible conduit having electrical wires therein, and with the electrical wires extending outwardly from a distal end of the conduit. As a further alternative, the power connection means can include a flexible conduit with a multi-port connector positioned at a distal end of the conduit.

Still further, and in accordance with other aspects of the invention, the grommet assembly can include latching cam assemblies for removably securing the grommet assembly to the work table. Each latching cam assembly can include a cylindrical bushing integrally coupled with or otherwise secured to the inner surface of the casing. Each bushing includes a vertically disposed cylindrical aperture, with a first cylindrical portion having a diameter sufficient so as to receive the head of a threaded screw, in a counter-sunk configuration. The latching cam assembly can also include a cam element having an upstanding sleeve portion and a horizontally disposed foot integrally formed with or otherwise secured to the lower end of the upstanding sleeve portion. A threaded aperture can extend at least partially through the upstanding sleeve portion, with the aperture adapted to threadably receive the threaded screw. The foot can include a leg extending from the underside of the upstanding sleeve portion. A boss projects upwardly from the distal end of the leg.

BRIEF DESCRIPTION OF THE DRAWINGS

The invention will now be described with reference to the drawings in which:

FIG. 14 is a plan view of the energy center shown in FIG. 9;

FIG. 15 is a perspective view of the energy center shown in FIG. 9;

FIG. 16 is a front elevational view of the energy center shown in FIG. 9;

FIG. 17 is a side elevational view of the energy center shown in FIG. 9;

FIG. 21 is a perspective and stand alone view of a cord version of the warmer grommet assembly in accordance with the invention;

FIG. 22 is a hardwire version of the warmer grommet assembly in accordance with the invention;

FIG. 23 is a warmer grommet assembly in accordance with the invention, showing the assembly with one of the inventor's known connectors;

FIG. 24 is a front elevation view, in a stand alone configuration, of the warmer grommet assembly in accordance with the invention;

FIG. 25 is a top, plan view of the warmer grommet assembly shown in FIG. 24;

FIG. 26 is a side, elevation view of the warmer grommet assembly shown in FIG. 24;

FIG. 27 is a bottom, underside view of the warmer grommet assembly shown in FIG. 24;

DESCRIPTION OF THE PREFERRED EMBODIMENTS

The principles of the invention are disclosed, by way of example, within liquid warmer grommet assemblies 400 and 500 as illustrated in FIGS. 18-33. In accordance with the invention, the warmer grommet assemblies 400, 500 provide for a means to maintain a cup of liquid (or other material) at a desired temperature through the use of a heating element which is insertable into a grommet mounted to a work surface or the like. Various types of electrical connections can be made to power sources so as to maintain the liquid at a desired temperature through the use of the heating element. The structure and functionality of the liquid warmer grommet assemblies 400, 500 in accordance with the invention preclude the necessity of any type of bulky (or electrically dangerous) burner or warmer assemblies positioned on the work surface so as to maintain liquid temperatures. Further, the warmer grommet assemblies 400, 500 in accordance with the invention preclude the necessity of the user having to constantly refill the liquid cup by getting up from the user's work station and going to the location of a coffee brewing station, hot water dispenser or the like.

Prior to describing the liquid warming grommet assemblies 400, 500 in accordance with the invention, two embodiments of energy centers that may be utilized on work surfaces are first described herein. These energy centers are known in the prior art and are described in detail in the previous referenced U.S. Pat. No. 6,379,182 to Byrne issued Apr. 30, 2002. The energy center as described in the subsequent paragraphs herein do not specifically relate to any type of warmer assemblies, but disclose the concepts generally relating to the mounting of electrical interconnection apparatus on work surfaces.

A prior art energy center 100 is first described herein, and illustrated in FIGS. 1-8. A second embodiment of an energy center is then described herein, as energy center 300 illustrated in FIGS. 9-17.

Figure 1:
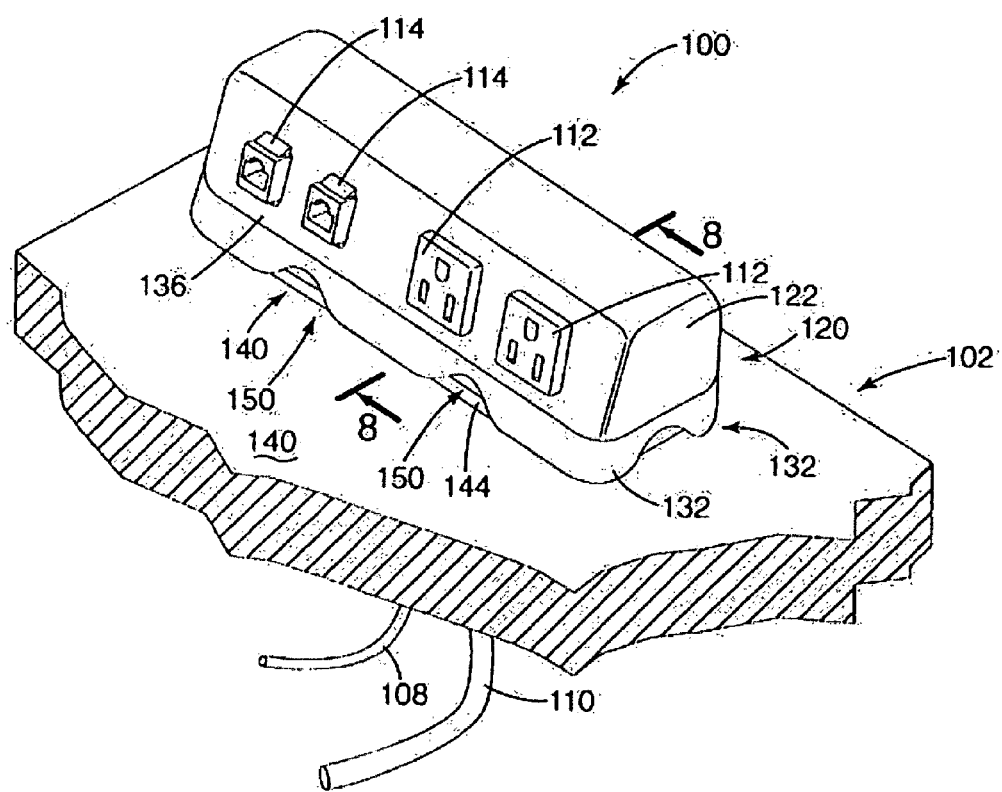
FIG. 1 is a perspective view of a prior art energy center having an interchangeable base support, and mounted to a work surface which is shown in a partial breakaway format.
Figure 2:
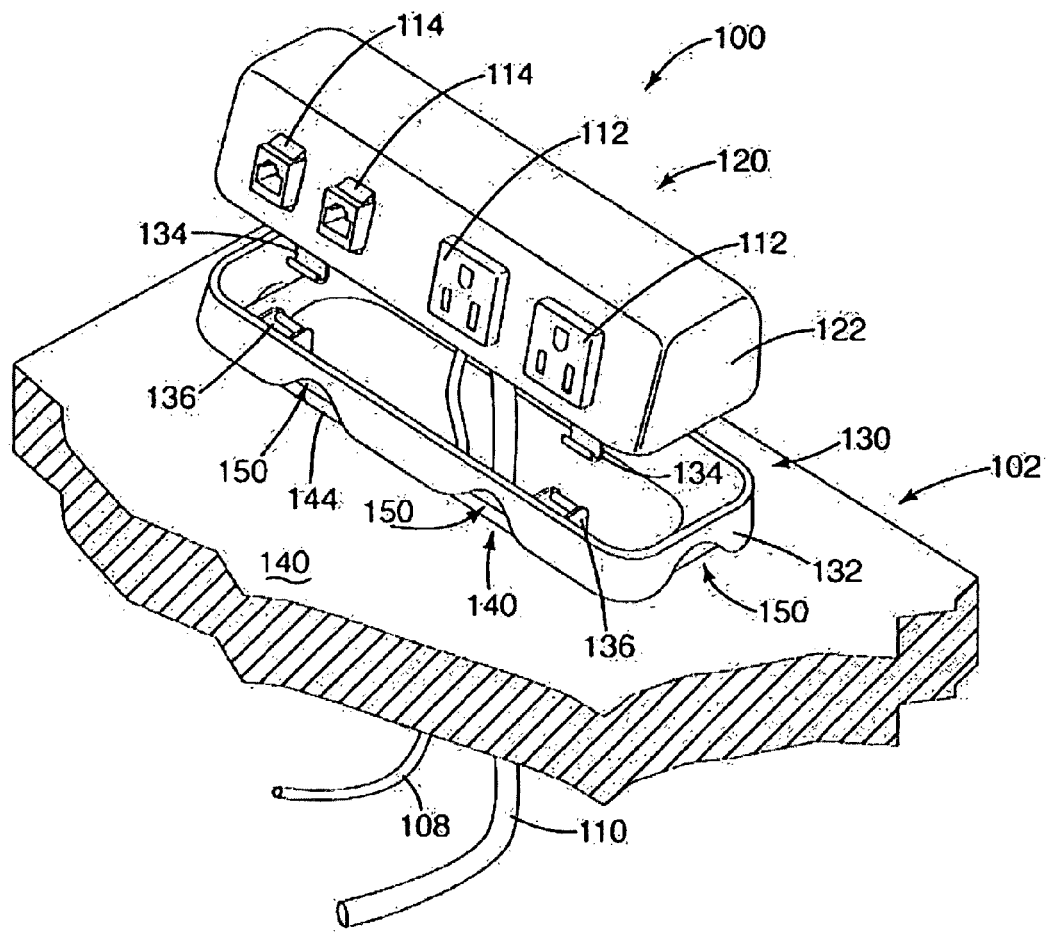
FIG. 2 is a partial exploded view of the energy center illustrated in FIG. 1, showing the energy center upper housing as separate from the energy center base support.

With reference first to FIGS. 1-9, the energy center 100 is adapted to be mounted within a furniture component such as the work surface 102. The work surface 102 includes a planer surface 104. Within the planer surface 104 is a formed slot 106 (illustrated in FIG. 8) which extends through the work surface 102. The energy center 100 is adapted to accept energy through energized conductors such as the data lines 108 and the electrical power cords 110. Only one of each of the data lines 108 and power cords 110 is illustrated in FIG. 1 and the subsequent drawings. The work surface 102 can, for example, be the working surface of a desk or similar furniture component. Typically, the work surface 102 may have a veneer as its planar surface 104 or other conventional protective and aesthetically desirable surface secured to the top of the work surface 102.

Typically, the power cords 110 would be interconnected with a conventional power source located below the work surface 102. The power cords 110 will provide a relatively simplistic structure and aesthetically desirable means for transferring power from the conventional power source located below the work surface 102 (the power source not being shown) to one or more electrical outlet receptacles associated with the energy center 100, such as the electrical outlet receptacles 112. By plugging into electrical outlet receptacles 112, other electrical devices (not shown) mounted on or near the work surface 102 may then be energized from the receptacles 112.

The data lines 108 can be interconnected to incoming voice/data nodes (not shown) also located below the work surface 102. As described in subsequent paragraphs herein, the data lines 108 can then be connected to the data ports 114. Through the use of the data ports 114, telephones, computer cable connectors or similar interconnections can be made for purposes of providing voice/data or similar communications to appropriate devices, such as telephones and computers.

Figure 8:
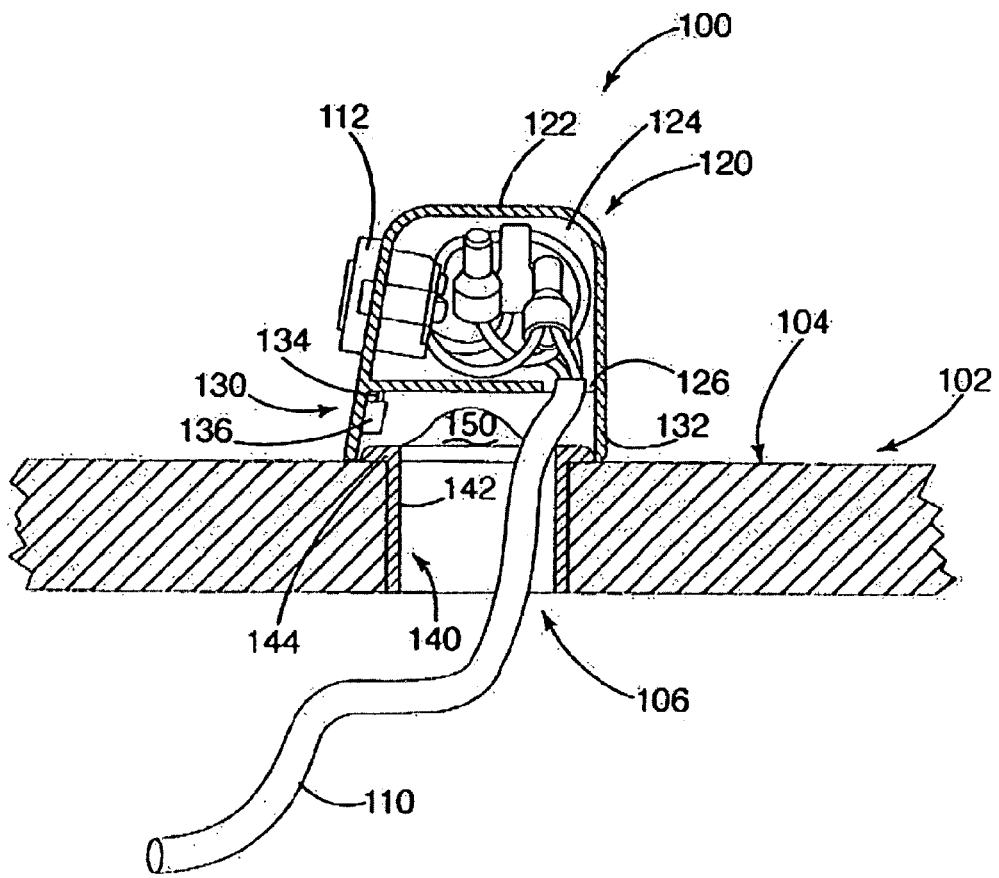
FIG. 8 is a sectional view of the energy center and work surface illustrated in FIG. 1, taken along section lines 8-8 of FIG. 1.
Figure 9:
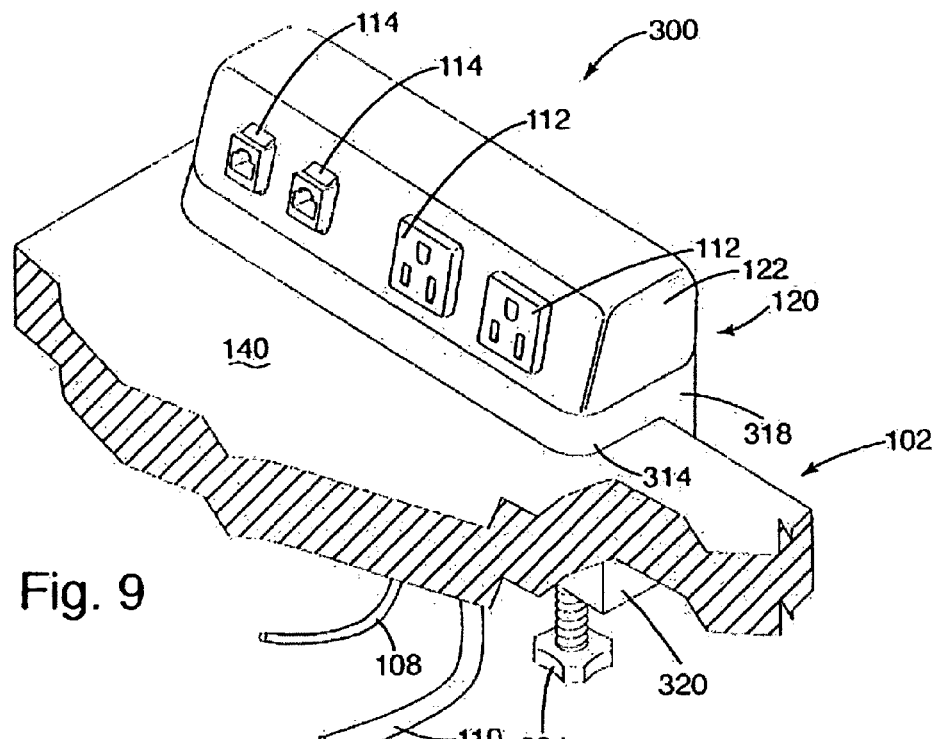
FIG. 9 is a perspective view of a second embodiment of an energy center with an interchangeable base support in accordance with the invention, and showing connection of the energy center to a work surface, with the work surface shown in a partial breakaway format.
Figure 10:
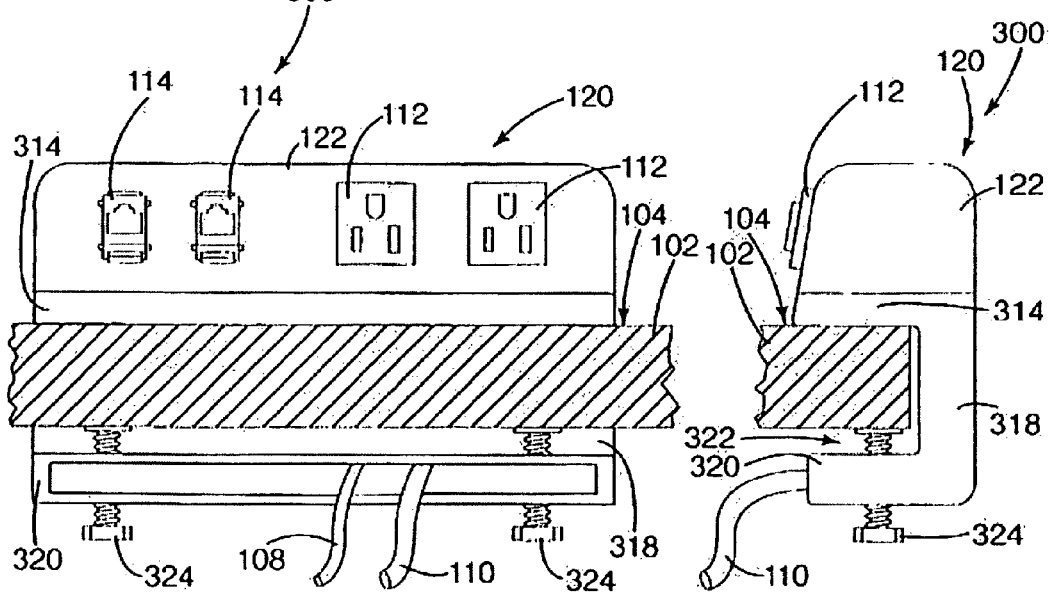
FIG. 10 is a front elevational view of the energy center and work surface shown in FIG. 9.
Figure 11:
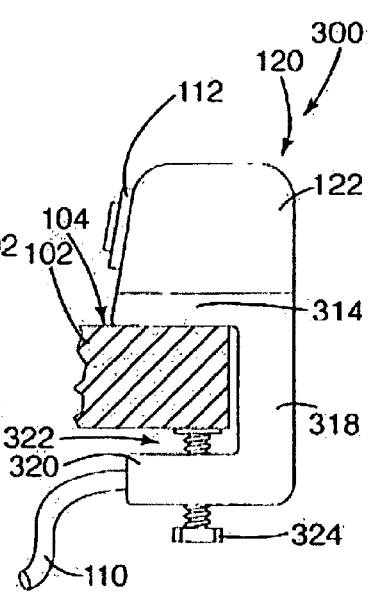
FIG. 11 is a side elevational view of the energy center and work surface shown in FIG. 9.

With reference primarily to FIGS. 1-3 and 8, the energy center 100 includes an energy center upper housing 120 comprising an outer shell 122. As shown in FIG. 8, the upper housing 120 includes an interior spacial area 124 for housing the appropriate electrical wires and portions of the electrical receptacles 112 and data ports 114 which are necessary for purposes of providing energy through the power cords 110 and data lines 108. The power cords 110 and data lines 108 access the spacial area 124 through an open slot area 126.

Figure 3:
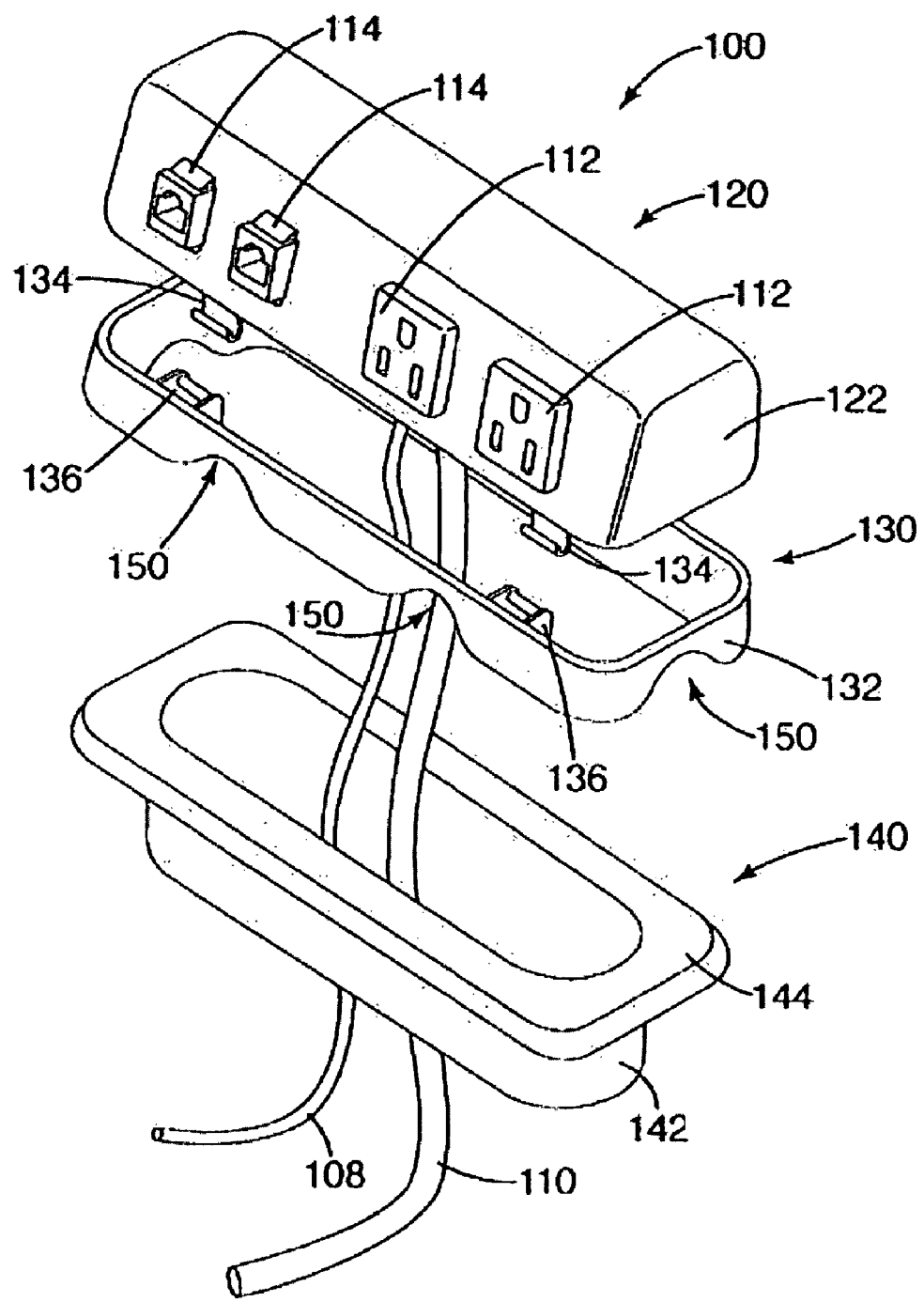
FIG. 3 is a further exploded view of the energy center illustrated in FIG. 1, showing the separate components comprising the energy center upper housing, the base support and the work surface grommet housing.
Figure 4:
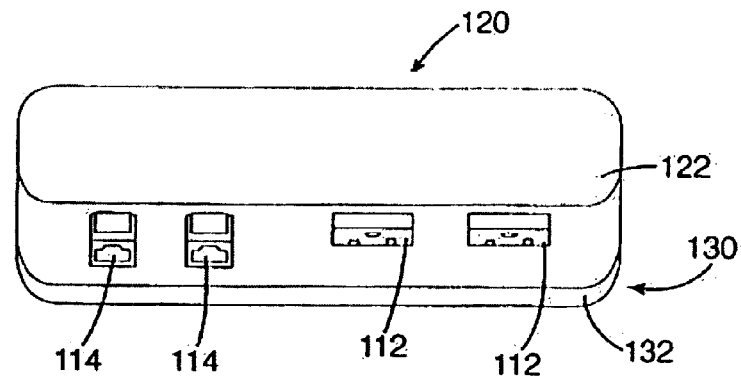
FIG. 4 is a plan view of the energy center upper housing.
Figure 5:
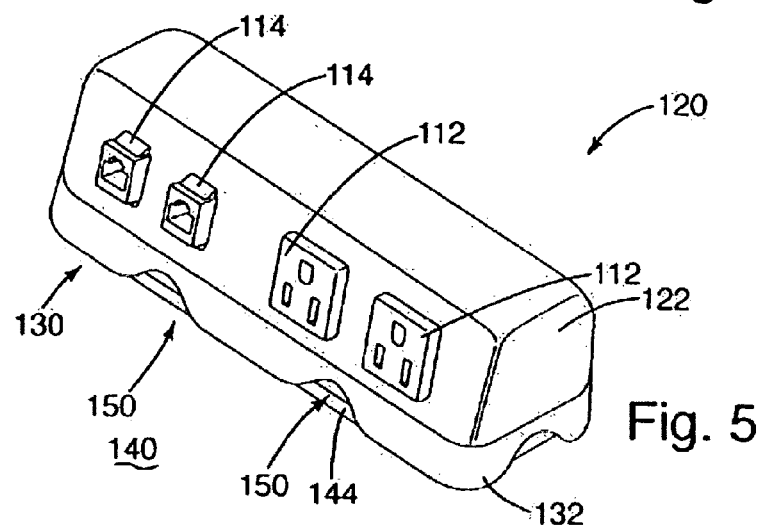
FIG. 5 is a perspective view of the energy center upper housing.
Figure 6:
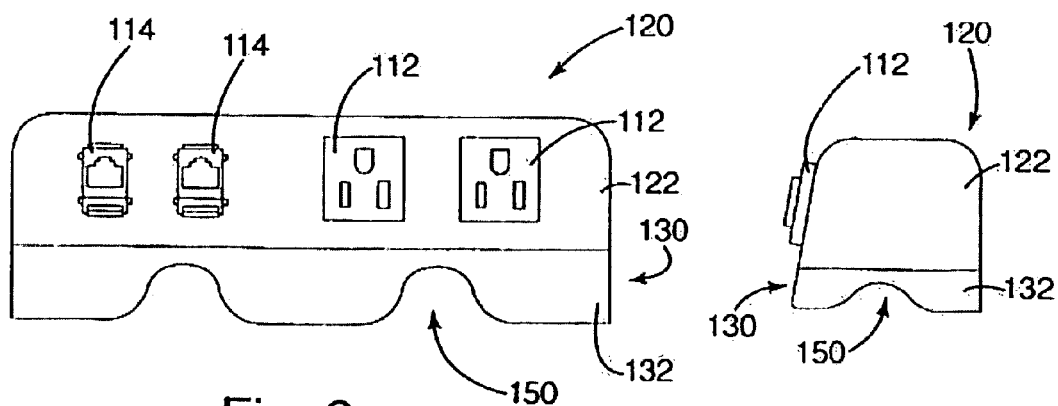
FIG. 6 is a front elevational view of the energy center upper housing.
Figure 7:
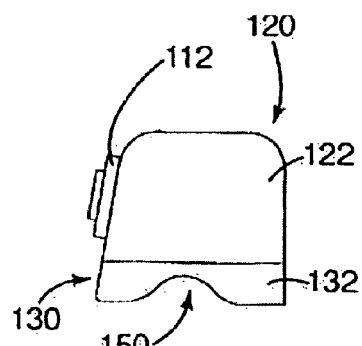
FIG. 7 is a side view of the energy center upper housing.

The energy center upper housing 120 is adapted to be mounted to a particular one of several base supports, such as the base support 130 primarily shown in FIG. 3. The base support 130 comprises a substantially rectangular shell portion 132 which is adapted to be releasably mounted to the energy center upper housing 120. The releasable mounting is provided through releasable connecting means such as the hooks 134 which are mounted to the lower frontal portion of the outer shell 122 of the energy center upper housing 120. The hooks 134 are adapted to be releasably secured to the hook retainers 136. The hook retainers 136 are mounted to the interior surface of a front portion of the shell 132 of the base support 130. It should be emphasized that many different kinds of connecting means can be utilized for purposes of releasably securing the energy center upper housing 120 to the base support 130. The hooks 134 and hook retainers 136 are merely an example of one type of connecting arrangement.

For purposes of providing an aesthetic and convenient means of extending the power cords 110 and data lines 108 up through the work surface 102, the slot 106 can be utilized with a grommet structure, such as the grommet structure 140 primarily illustrated in FIG. 3. The grommet structure 140 can be essentially shaped as illustrated in FIG. 3, and includes a vertically disposed casing structure 142, with the casing 142 extending downwardly into the slot 106 and forming the outer perimeter thereof.

Mounted to the upper edge of the casing portion 142, and potentially integral therewith, is a horizontally disposed collar 144. The horizontally disposed collar 144 has somewhat of a substantially rectangular configuration as primarily shown in FIG. 3. The slot 106 formed in the work surface 102 is configured to be somewhat slightly larger than the inner area formed by the casing 142. Accordingly, when the grommet structure 140 is mounted within the slot 106, the casing 142 is positioned below the planar surface 104. Correspondingly, the outer perimeter of the collar 144 overhangs the slot 106 so as to be positioned above the planar surface 104, with the lower surface of the collar 144 substantially flush with the planar surface 104. In this manner, the collar 144 provides a supporting surface for the grommet 140.

If desired, the grommet 140 can be rigidly secured to the work surface 102. Such arrangements are shown in the previously described and commonly owned U.S. Pat. Nos. 4,747,788 and 5,351,173 to Byrne.

If desired, the base support 130 of the energy center 100 can also be secured, either to the planar surface 104 or to the grommet 140. Specific securing arrangements are not illustrated in the drawings. Alternatively, it is also possible merely to position the energy center 100 over the slot 106 and grommet 140. In this manner, if desired, the energy center 100 can be selectively positioned over various other slots and grommets which may be positioned within the work surface 102.

It should be noted that with the particular energy center 100, comprising the upper housing 120 and the base support 130, the power cords 100 and data lines 108 are substantially hidden from view during use of the energy center. However, slots 150 may also be formed in the base support 130, and provide a means for extending power cords 110 and data lines 108 from atop the planar surface 104. The energy center 100 provides an aesthetically pleasing and functional energy center for use on a planar surface 104 of a work surface 102, without requiring substantial effort in moving the energy center 100 to other locations on the work surface 102, or otherwise connecting and disconnecting power cords and data lines associated with the same.

To illustrate a basic principle with respect to the interchangeability of base supports for the energy center, a second embodiment of an energy center is shown by the energy center 300 illustrated in FIGS. 9-17. For purposes of description, components of the energy center 300 identical to components of the energy center 100 will be referenced with like numerals.

As with the energy center 100 previously described with respect to FIGS. 1-8, the energy center 300 is adapted to be utilized with a work surface 102 having a planar surface 104. However, unlike the previously described energy center 100 with the base support 130, the energy center 300 is adapted to be mounted to an edge or end of the work surface 102, as particularly shown in FIGS. 9 and 11. Also, as with the energy center 100, the energy center 300 includes an energy center upper housing 120 having an outer shell 122. The energy center upper housing 120 mounts electrical receptacles 112 and data ports 114 in a conventional manner. The electrical receptacles 112 are electrically interconnected to the power cord 110, while the data ports 114 are connected for communications with the data line 108.

Figure 12:
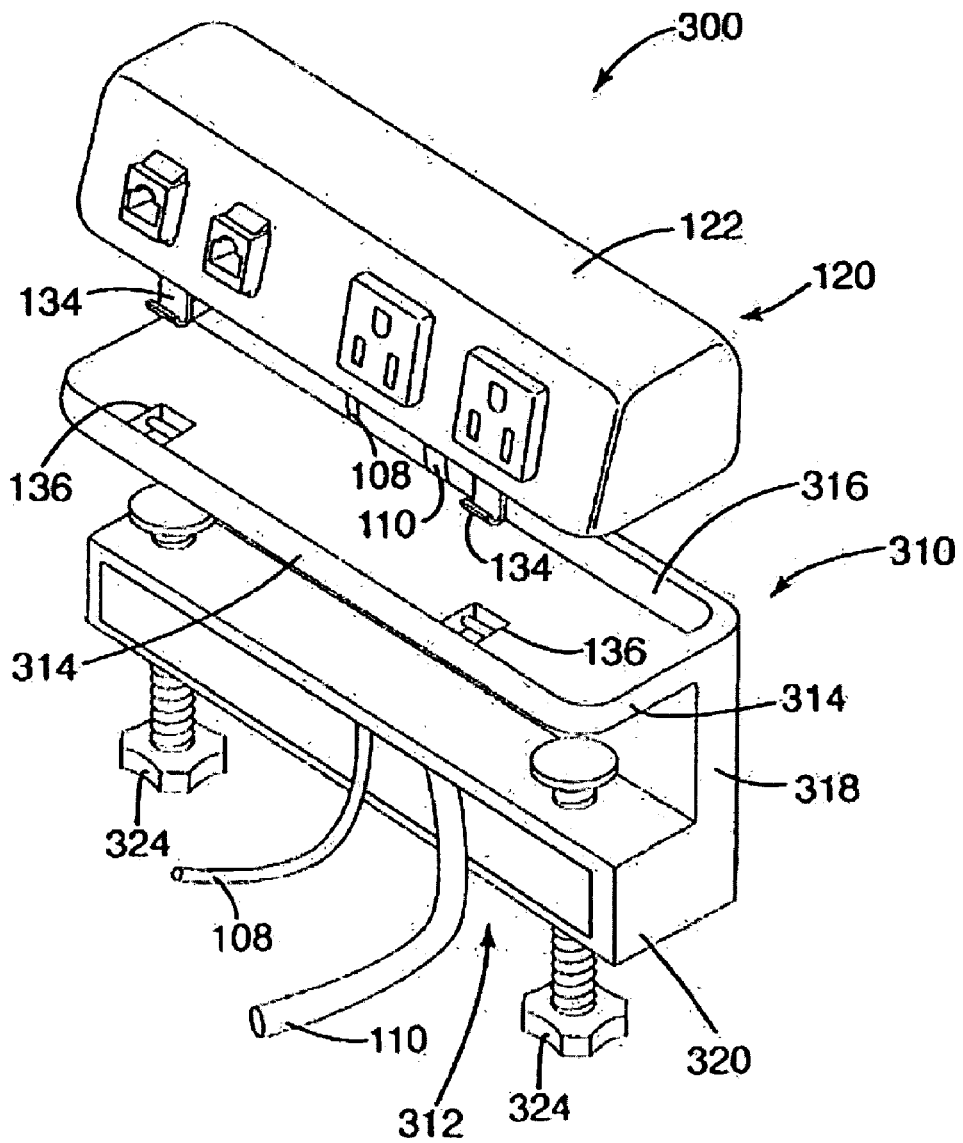
FIG. 12 is an exploded view of the energy center shown in FIG. 9, and illustrating the separate components comprising the energy center upper housing and the base support.
Figure 13:
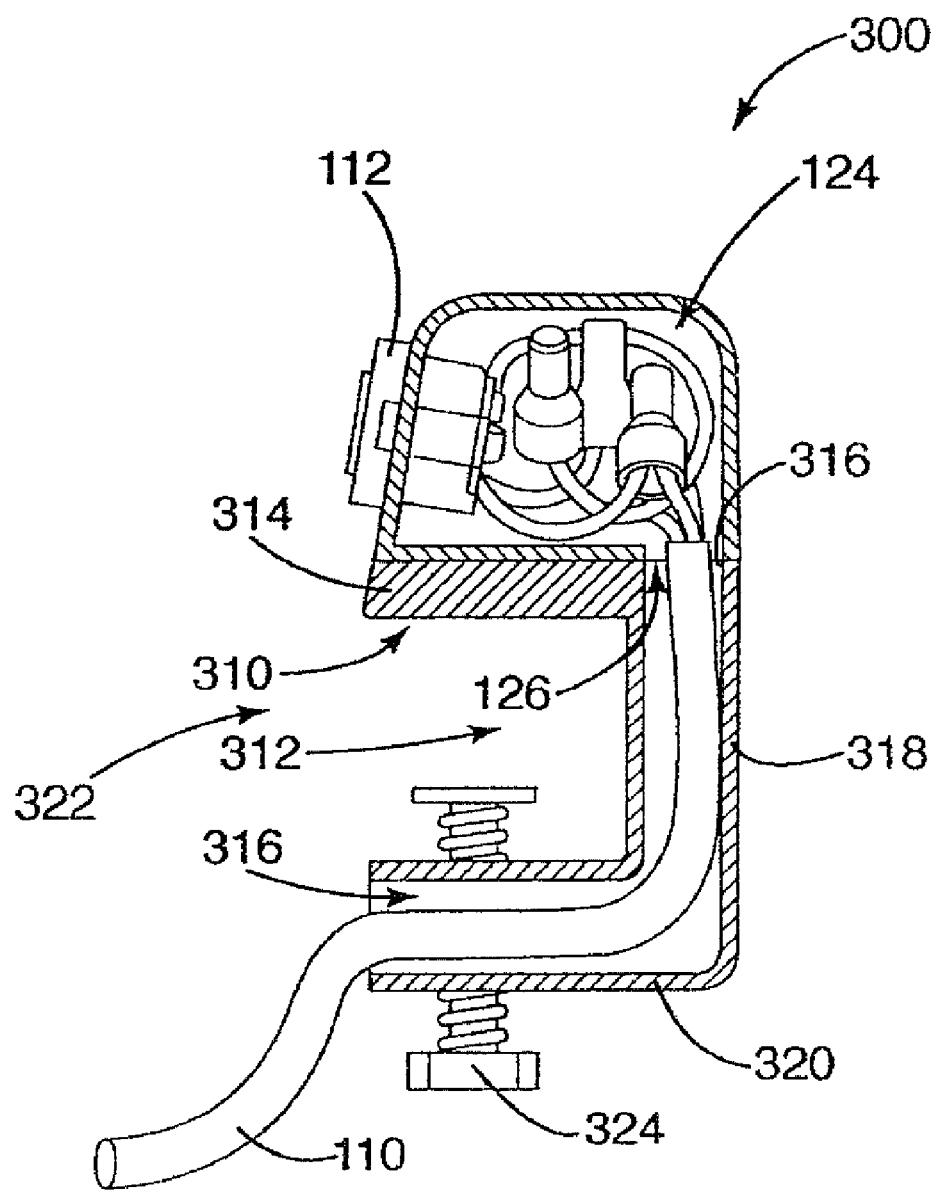
FIG. 13 is a sectional side view of the energy center of FIG. 9, taken along section lines 13-13 of FIG. 15.

With reference to several of the drawings, but primarily FIGS. 12 and 13, the energy center 300, unlike the energy center 100, includes a second base support 310 which is in the form of a clamping device 312 utilized for purposes of releasably securing the energy center 300 to an edge of the work surface 102. More specifically, the energy center upper housing 120, as with the energy center 100, includes a pair of hooks 134 which are adapted to be releasably secured to hook retainers 136 mounted within the clamping device 312. As with the energy center 100, the hooks 134 and hook retainers 136 provide a means for releasably securing the energy center upper housing 120 to the base support comprising the clamping device 312.

The hook retainers 136 are located within a portion of the clamping device 312 comprising an upper cantilever section 314. The cantilever section 314 comprises an upper planar section having a slot 316 through which the power cords 110 and data lines 108 may extend. The slot 316 is formed at the rear portion of the clamping device 312 and upper cantilever section 314, and opens into the spacial area 124 and aperture portion 126.

The upper cantilever section 314 is connected to or preferably integral with an interconnecting vertical portion 318 extending downwardly from the cantilever section 314. The slot 316 extends through the interconnecting section 318. Connected to or otherwise preferably integral with the lower portion of the interconnecting section 318 is a lower clamp section 320 which extends forwardly from the interconnecting section 318. The lower clamping section 320, interconnecting section 318 and upper cantilever section 314, form a slot 322 which opens forwardly. The slot 322 is appropriately configured and sized so that it is adapted to receive an edge of the work surface 102 as illustrated primarily in FIGS. 9, 10, and 11. For purposes of releasably securing the clamping device 312 to the work surface 102, appropriate clamping screws 324 may be employed.

Also of interest and importance is the positioning of the power cords 110 and data lines 108 through the clamping device 312. As primarily shown in FIG. 13, the slot 316 extends not only through the interconnecting section 318, but also extends in a horizontal manner and forwardly through the lower clamping section 320. In this manner, the power cords 110 and data lines 108 can still be brought forwardly so as to be positioned below the work surface 102, rather than being extended downwardly but out from under the protective area of the work surface 102. However, other types of slotting and guidance arrangements for the power cords 110 and data lines 108 can be utilized.

Turning now to the present invention, the principles of the invention are disclosed, by way of example, in first and second example embodiments of liquid warming grommet assemblies 400 and 500, respectively, as illustrated in FIGS. 18-33. In accordance with the invention, the grommet assemblies 400, 500 provide means for maintaining coffee, hot water and other liquids (or other materials) at a desired, raised temperature through the use of a heating element mountable to a work surface or similar structure. The grommet assemblies 400, 500 in accordance with the invention are recessed, in a manner so that they can be substantially flush with the work surface, and do not take up any substantial volume on the work surface.

Figure 18:
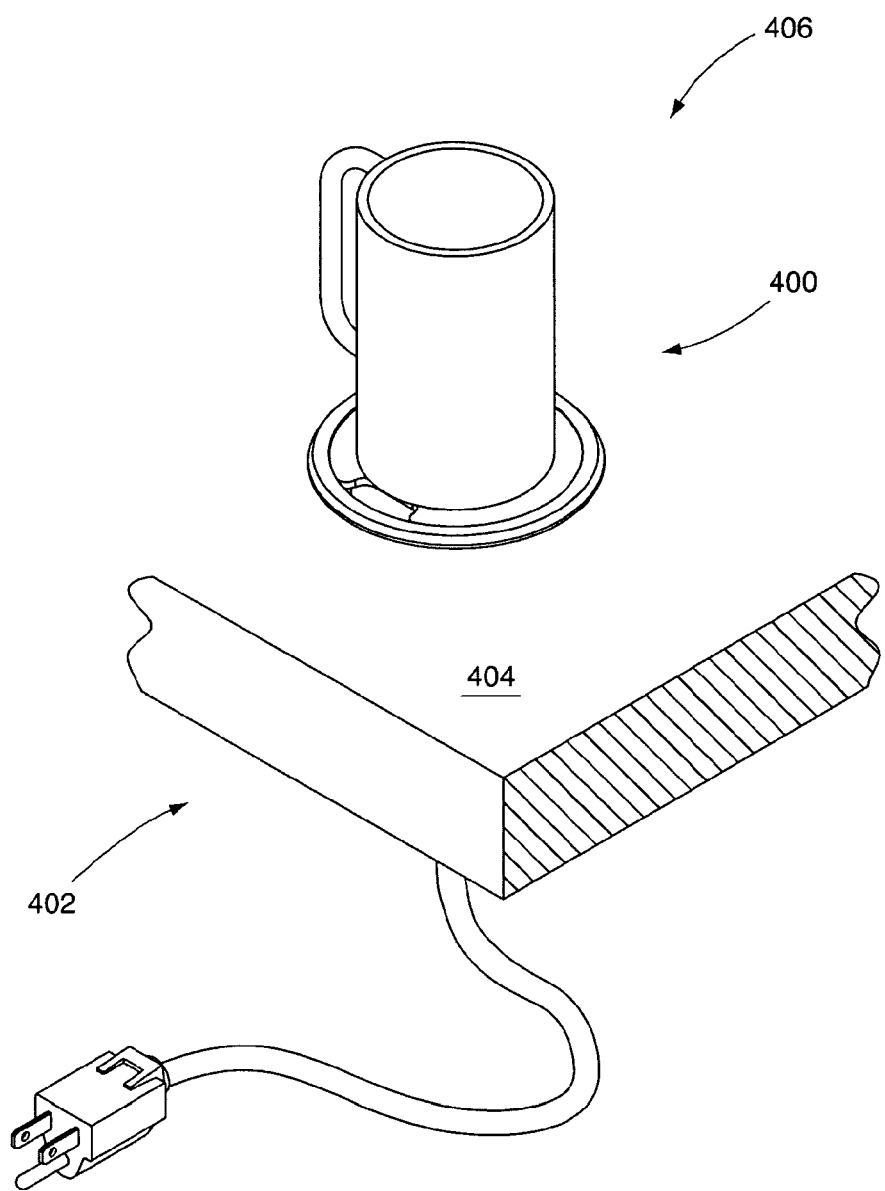
FIG. 18 is a perspective view of a liquid warmer grommet assembly in accordance with the invention, as assembled into a conventional work surface.

More specifically, FIG. 18 illustrates the first embodiment of the liquid warmer grommet assembly 400 in accordance with the invention. The grommet assembly 400 is shown as being mounted within a work table or other furniture item 402 having an upper work surface 404 (the work table 402 and upper work surface 404 being shown in a partial, cut out configuration). The grommet assembly 400 is further shown in FIG. 18 as supporting a coffee cup or vessel 406 which may be filled with various types of liquids or other materials which the user wishes to maintain at a desired, raised temperature.

Figure 20:
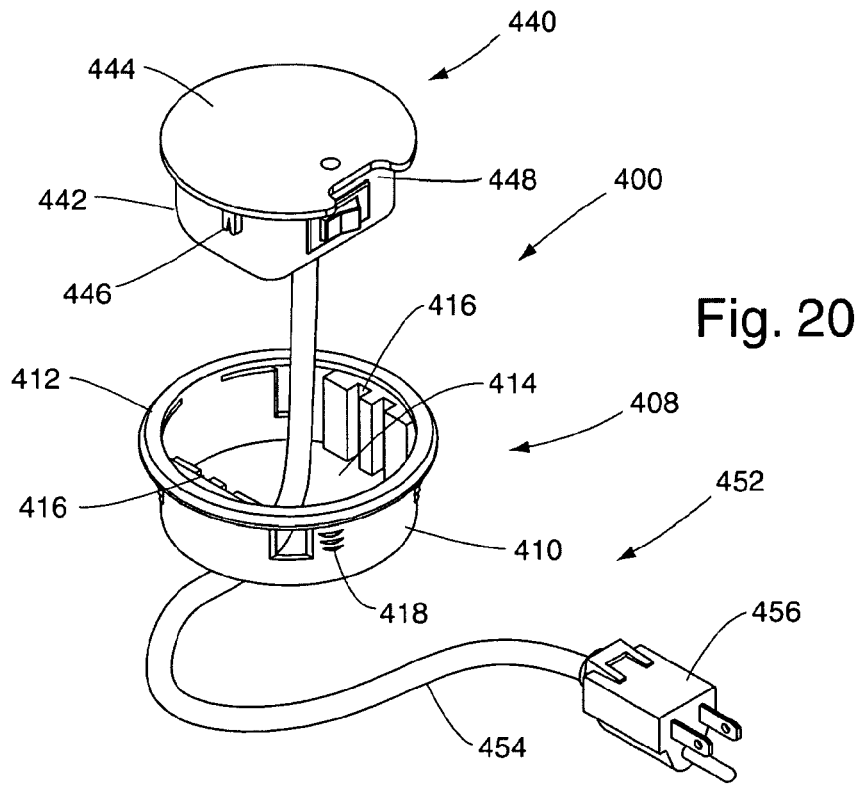
FIG. 20 is a perspective and partially exploded view of the warmer grommet assembly shown in FIG. 19, but with the absence of the latching cams.

Turning to FIG. 20, the liquid warmer grommet assembly 400 is illustrated in a partially exploded and stand-alone configuration. As shown therein, the liquid warmer grommet assembly 400 comprises a grommet 408 which is adapted to be mounted within an aperture cut into and through the upper work surface 404. The grommet 408 includes a lower, cylindrical casing 410. Mounted to or otherwise integral with the upper edge of the casing 410 is a horizontally disposed upper collar 412. The collar 412 has a cylindrical configuration, and is concentric with the casing 410.

Although not specifically shown in FIG. 18 or the other drawings, the work table 402 and upper work surface 404 can have a cylindrical slot or aperture formed therein. The slot or aperture can have a diameter which is just slightly larger than the outer diameter of the cylindrical casing 410. In use, the grommet 408 is inserted into the slot so that the cylindrical casing 410 is positioned below the upper work surface 404 of the work table 402. Correspondingly, the upper collar 412 is configured so that its outer diameter is slightly larger than the diameter of the slot. Accordingly, when the cylindrical casing 410 is inserted into the slot, the outer parameter of the upper collar 412 overhangs the slot, so as to positioned above the work surface 404, with the lower surface of the collar 412 substantially flush with the upper support surface 404. In this manner, the collar 412 provides a supporting surface for the grommet 408.

The cylindrical casing 410 and upper collar 412 form what could be characterized as a housing interior 414 within the casing 410. As further shown in FIGS. 20 and 28, the housing interior 414 includes a pair of opposing alignment slots 416. As will be described in subsequent paragraphs herein, the alignment slots 416 are utilized to couple the heating element to the grommet 408 in an appropriate alignment. Still further, and as shown primarily in FIGS. 20 and 29, the outer surface of the cylindrical casing 410 includes sets of press-fit ribs 418. The use of press-fit ribs is well known in the office furniture and electrical component industries, and are sized and configured so that when the cylindrical casing 410 is inserted into the slot (not shown) of the work table 402 and upper work surface 404, the ribs 418 will provide for a friction fit with the inner surface of the slot.

In addition to the grommet 408, the warmer grommet assembly 400 includes a heating element 440. The heating element 440 is primarily shown in FIGS. 20 and 21-27. With reference thereto, the heating element 440 includes an element housing 442. When assembled, the grommet assembly 400 is configured so that the element housing 442 is received within the housing interior 414 of the grommet 408. As primarily shown in FIG. 27, the heating element 440 has a substantially rectangular and "box-like" configuration, with one side being curved. The cross dimensions of the heating element 440 are somewhat smaller than the diameter of the housing interior 414 of the grommet 408. Although not shown in substantial detail, conventional heating elements can be enclosed within the element housing 442. Mounted to the top of the element housing 442 is a warmer plate 444. As shown particularly in FIG. 25, the warmer plate 444 has a substantially circular configuration, with a finger slot 448 "cut out" of a part of the perimeter of the warmer plate 444. The element housing 442 and warmer plate 444 are configured so that when conventional heating elements (not shown) within the element housing 442 are energized, the warmer plate 444 will maintain a temperature which is appropriate for maintaining liquids within the coffee cup 406 at a raised, but "drinkable" temperature. Again, such heating elements are well known in the prior art and are commercially available.

As further shown primarily in FIGS. 24, 26 and 27, mounted on opposing sides of the bottom of the warmer plate 444 are a pair of element ears 446. The element ears have a cross configuration as primarily shown in FIG. 26. The ears 446 are sized so that they can be compressed and receivable within opposing ones of the alignment slots 416 associated with the housing interior 414 of the grommet 408. In this manner, the heating element 440, when inserted into the cylindrical casing 410 of the grommet 408, will be in an appropriate and constant alignment. In addition to the foregoing components, the heating element 440 may also comprise a power switch 450 mounted to one side of the element housing 442. The power switch 450 is primarily shown in FIGS. 20 and 24. Although not shown in any detail, the power switch 450 may preferably have two states, namely an "on" and an "off" state. The power switch 450 may be connected in a conventional manner to electrical elements (not shown) within the element housing 442, positioned below the warmer plate 444. When externally energized, the heating elements within the element housing 442 can be controlled as to enablement or disablement of power through the use of the power switch 450. Further, as apparent from FIGS. 20, 24 and 25, the power switch 450 is located immediately below the finger slot 448. Accordingly, even with the element housing 442 received within the housing and interior 414 of the cylindrical casing 410 when the warmer grommet assembly is completely assembled together, the user still has the capability of accessing the power switch 450 through the finger slot 448.

For purposes of energizing the electrical elements within the element housing 442, power can be supplied to these elements through various means. For example, and as shown in FIGS. 18, 20, 21 and other illustrations, the heating element 440 can be energized through the use of a power cord assembly 452. The power cord assembly 452 can include a conventional power cord 454 carrying electrical wires into the interior of the element housing 442. In a conventional manner, these wires can be connected to the appropriate electrical elements, so as to provide for a heating function. The opposing end of the cord 454 can be connected in a conventional manner to a three-prong or similar plug 456, adapted to be received within a conventional power outlet of an electrical receptacle.

An alternative assembly can include the hard wire assembly 458 primarily illustrated in FIG. 22. The hard wire assembly 458 can include a flexible conduit 460 carrying wires 462. One end of the flexible conduit 460 and the wires 462 is connected into the interior of the element housing 442, and further connected to appropriate electrical elements. The opposing end of the conduit 460 may be opened, so as to expose the wires 462. These wires may be connected to any of a number of various components for providing electrical power. For example, such wires 462 could be connected directly to a conventional junction box or the like.

A still further assembly configuration is illustrated in FIG. 23, and is referred to herein as a connector assembly 464. The connector assembly 464 can include the flexible conduit 460 utilized with the hard wire assembly 458. However, instead of exposed wires extending outwardly from an open end of the conduit 460, the connector assembly 464 includes a multiport connector 466 connected to a distal end of the flexible conduit 460. The connector 466 may be any one of a number of known multi-port or multi-circuit connectors.

Figure 19:
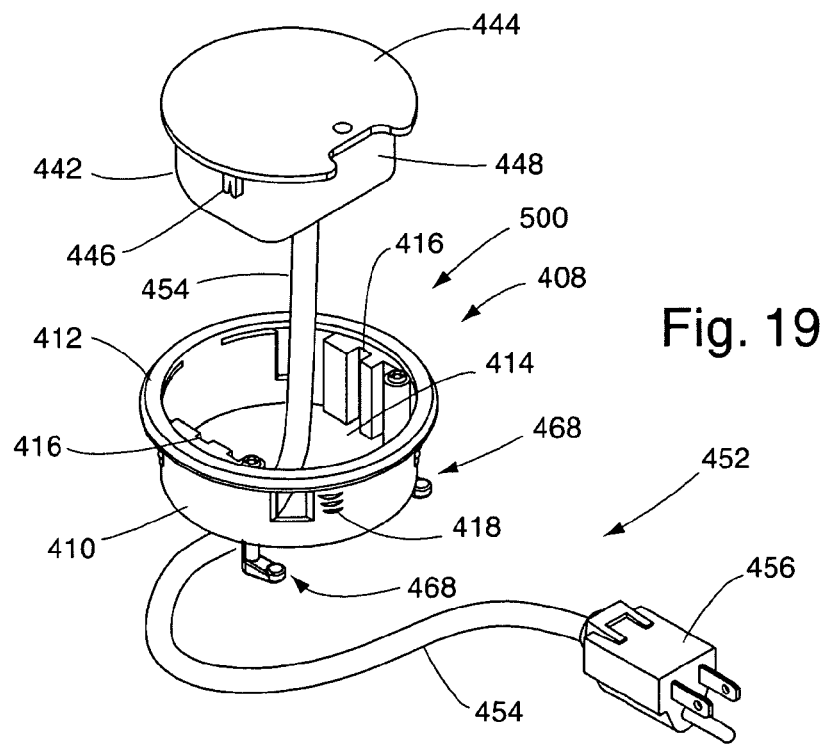
FIG. 19 is a perspective and partially exploded view of the grommet assembly shown in FIG. 18, expressly showing the use of latching cams with a grommet and warming plate assembly.
Figure 28:
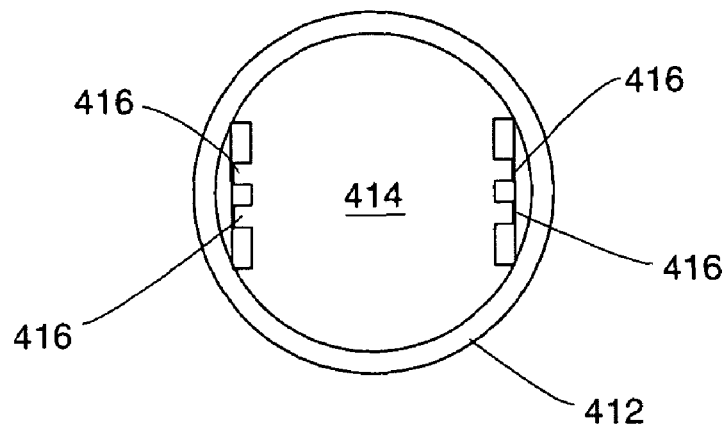
FIG. 28 is a top, plan view of a grommet in accordance with the invention, having a press fit configuration.
Figure 29:
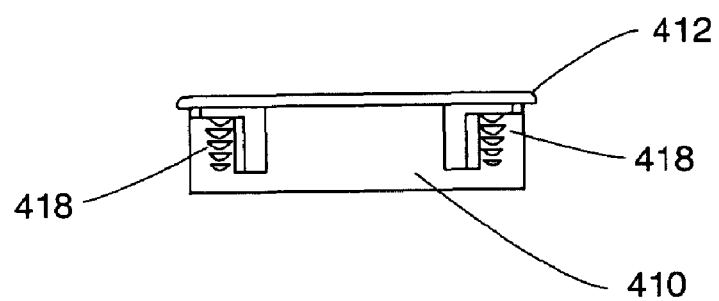
FIG. 29 is a side, elevation view of the grommet shown in FIG. 28.
Figure 30:
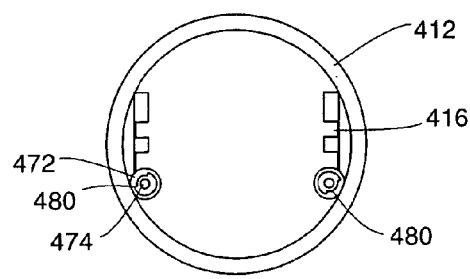
FIG. 30 is a top, plan view of a grommet in accordance with the invention, showing a configuration employing the latching cams.
Figure 32:
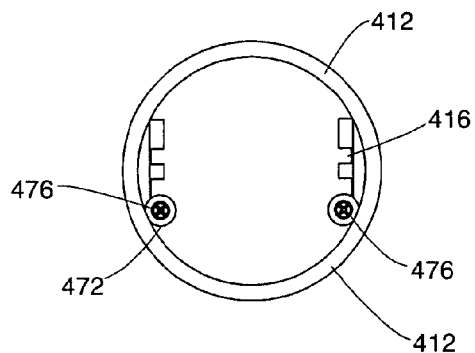
FIG. 32 is a top, plan view of the grommet shown in FIG. 30, but with the connecting screws in a fully assembled state.
Figure 31:
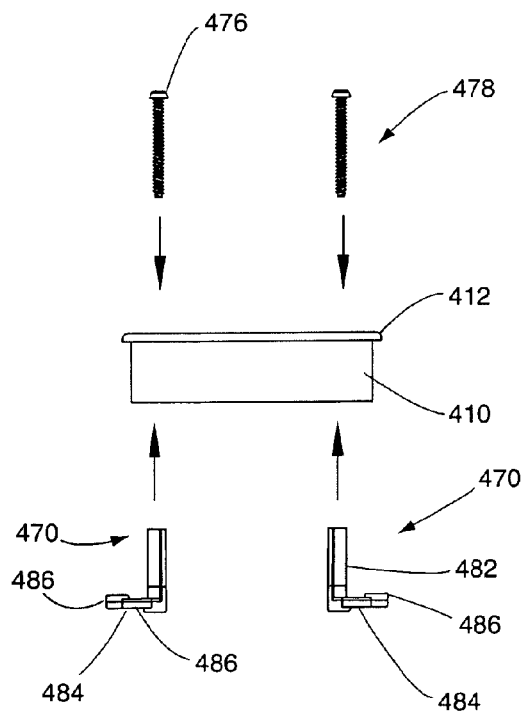
FIG. 31 is a front, elevation and partially exploded view showing the latching cams and connecting screws for the grommet shown in FIG. 30.
Figure 33:
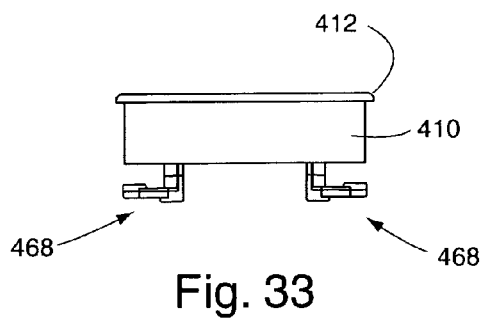
FIG. 33 is a front, elevation view of the grommet shown in FIG. 32, with the latching cams in a fully assembled state.

In addition to the warmer grommet assembly 400, the disclosure herein also includes a second embodiment of a grommet assembly in accordance with the invention, referred to herein as liquid warmer grommet assembly 500, as illustrated in FIG. 19. The warmer grommet assembly 500 is substantially identical to the warmer grommet assembly 400, with the exception that the warmer grommet assembly 500 includes what can be characterized as a pair of latching cam assemblies 468. Because other components of the warmer grommet assembly 500 are substantially identical to those of the warmer grommet assembly 400, such elements will not be described in any detail herein. Primarily, the latching cam assemblies 468 are illustrated in FIGS. 19 and 30-33. With reference thereto, the latching cam assemblies 468 are utilized to removably secure the grommet 408 of the grommet assembly 500 to the work surface 404 and work table 402. More specifically, and with reference primarily to FIGS. 30-33, each of the latching cam assemblies 468 includes a cylindrical bushing 472 which is vertically oriented and integrally coupled with or otherwise secured to the inner surface of the cylindrical casing 410, as shown in FIGS. 30 and 32. For purposes of brevity, the structural configuration of only one of the latching cam assemblies 468 will be described, it being understood that the configuration of the other latching cam assembly 468 is substantially identical.

Within each of the bushings 472 is a vertically disposed cylindrical aperture 474. The cylindrical aperture 474 includes a first cylindrical portion (not shown) having a diameter sufficient so as to receive the head 476 of a threaded screw 478, in a counter-sunk configuration. That is, the longitudinal length of the first cylindrical portion allows for the threaded screw 478 to be positioned so that the head 476 is below the top of the bushing 472 when the threaded screw 478 is assembled with the cam assembly 468. The cylindrical aperture 474 further includes a second cylindrical portion (not shown). At the lower portion of the cylindrical aperture 474, the aperture 474 includes a third substantially cylindrical portion (not shown), with a diameter substantially larger than the diameter of the threaded second cylindrical portion (not shown). The inner surface of the cylindrical bushing 472 includes an arcuate-shaped detent 480 which acts so as to essentially narrow the diameter of the third substantially cylindrical portion (not shown) within an arc of the maximum, circular cross-sectional area of the third cylindrical portion.

The latching cam assembly 468 further includes a cam element 470 having an upstanding sleeve portion 482 and a horizontally disposed foot 484 integrally formed with or otherwise secured to the lower end of the upstanding sleeve portion 482. The upstanding sleeve portion 482 can be formed as a substantially cylindrical portion having an arcuate-shaped sill. The sill may preferably be integrally formed with the substantially cylindrical portion of the upstanding sleeve portion 482. The arcuate-shaped sill is adapted to abut the arcuate-shaped detent 480 of the cylindrical bushing 472 when the cylindrical casing 410 is secured to the work surface 404. A threaded aperture may extend at least partially through the upstanding sleeve portion 482. The threaded aperture is adapted to threadably receive the threaded screw 478. The foot 484 includes a leg 486 extending from the underside of the upstanding sleeve portion 482. A boss 488 projects upwardly from the distal section of the leg 486.

The operation of the latching cam assemblies 468 in removably securing the cylindrical casing 410 to the work surface 404 will now be described. Each of the latching cam assemblies 468 is first inserted from the underside of the cylindrical casing 410 into a corresponding one of the bushings 472. More specifically, the upstanding sleeve portion 482 is inserted into the third substantially cylindrical portion, so that the substantially cylindrical portion and arcuate-shaped sill are received within the third substantially cylindrical portion. The relative sizes of the bushings and the cam assemblies 468 are such that the sills of the upstanding sleeve portions 482 are positioned relative to the detents 480 of the bushings 472 so as to appropriately cooperate with the same to allow insertion of the substantially cylindrical portions and sills into the third substantially cylindrical portion of the bushings 472. The connecting screws 478 are then inserted into the first cylindrical portions of the bushings 472 from above the cylindrical casing 410, and threadably secured within the threaded apertures 474 of the upstanding sleeve portions 482.

For purposes of inserting the cylindrical casing 410 and the latching cam assemblies 468 into the slot within the work surface 404, the latching cam assemblies 468 are first positioned with the feet 484 in a manner such that the legs 486 extend parallel to the walls of the cylindrical casing 410. For this configuration, the detents 480 and the arcuate-shaped sills must be of a relative configuration to allow the specific positioning of the legs 486.

With this configuration, the cylindrical casing 410 can be inserted into the slot of the work surface 404. After such insertion, the connecting screws 478 can each be turned clockwise. As the connecting screws 478 are turned clockwise, they will rotate the substantially cylindrical portion of the upstanding sleeve portions 482. With this clockwise rotation, the cylindrical portions will continue to rotate until the sills abut one side of the corresponding detent 480 of the bushing 472. This abutment will then prevent any further clockwise and simultaneous rotational movement of the threaded screw 478 and sleeve portion 482, relative to the corresponding bushing 472. With this clockwise rotation, the feet 484 will correspondingly rotate in a clockwise position. When the detents 480 abut the sills, further rotational movement of the sleeve portions 482 and legs 486 is prevented. Also, in this position, the bosses 488 are located immediately beneath an underside of the work surface 404. Continued rotation of the connecting screws 478 will thereby cause upward movement of the upstanding sleeve portions 482 within the bushings 472. This upward movement will continue until the bosses 488 securely engage the underside portion of the work surface 404. In this manner, the cylindrical casing 410 can be readily secured within the slot of the work surface 404. Disassembly essentially requires counterclockwise rotation of the threaded screws 478. Concepts associated with latching cam assemblies for use with work surface mounted devices are disclosed in the commonly owned U.S. Pat. No. 6,290,518 to Byrne issued Sep. 18, 2001.

It will be apparent to those skilled in the pertinent arts that other embodiments of warmer grommet assemblies in accordance with the invention can be achieved. That is, the principles of warmer grommet assemblies in accordance with the invention are not limited to the specific embodiments described herein. It will be apparent to those skilled in the art that modifications and other variations of the above-described illustrative embodiments of the invention may be effected without departing from the spirit and scope of the novel concepts of the invention.

What is claimed is:

1. A liquid warming grommet assembly for use in maintaining liquid or other materials in a vessel at a desired temperature, said grommet assembly adapted to be mounted to a work table or other furniture item having a work surface, said grommet assembly comprising:
   a grommet having a lower casing receivable within an aperture within said work surface, said grommet also having an upper collar, said casing forming a housing interior;
   a heating element comprising a lower element housing adapted to be received within said housing interior, and an upper warmer plate adapted to be positioned substantially flush with said work surface;
   power connection means connected to said heating element and connectable to a source of electrical power, so as to energize said heating element;
   a plurality of alignment slots mounted to an inner surface of said casing;
   a plurality of element ears mounted to outer surfaces of said element housing, with each of said element ears adapted to be received within a corresponding one of said alignment slots;
   a plurality of press-fit ribs located on an outer surface of said casing;
   a power switch positioned on an outer surface of said element housing, and adapted to selectively enable or disable power being applied to said heating element from said source of electrical power; and
   a finger slot cut into said warmer plate above said power switch.

2. A liquid warming grommet assembly in accordance with claim 1, characterized in that said grommet assembly further comprises a plurality of latching cam assemblies adapted to removably secure said grommet to said work table.

3. A liquid warming grommet assembly for use in maintaining liquid or other materials in a vessel at a desired temperature, said grommet assembly adapted to be mounted to a work table or other furniture item having a work surface, said grommet assembly comprising:
   a grommet having a casing receivable within a slot of said work surface, and further having an upper collar, said casing forming a housing interior;
   a heating element comprising a lower element housing adapted to be received within said housing interior, and an upper warmer plate adapted to be positioned substantially flush with said work surface;

power connection means connected to said heating element and connectable to a source of electrical power, so as to energize said heating element; and a power switch mounted to an external surface of said element housing, and manually operable by a user for selectively enabling and disabling application of said electrical power to said heating element.

4. A liquid warming grommet assembly in accordance with claim 3, characterized in that:

said housing interior comprises at least two alignment slots positioned on interior surfaces of said casing; and said heating element further comprises at least two element ears mounted outside of said element housing, said element ears adapted to be received within corresponding ones of said alignment slots, so as to maintain said heating element in an appropriate alignment relative to said grommet.

5. A liquid warming grommet assembly in accordance with claim 3, characterized in that an outer surface of said casing comprises a plurality of press-fit ribs, so as to provide a friction fit with an inner surface of said slot when said grommet is received within said aperture.

6. A liquid warming grommet assembly in accordance with claim 3, characterized in that said power connection means comprises an electrical cord with electrical wires extending therethrough, and a multi-prong plug connected to said electrical wires and adapted to be electrically and mechanically connected to an electrical receptacle.

7. A liquid warming grommet assembly in accordance with claim 3, characterized in that said power connection means comprises a flexible conduit having electrical wires extending therethrough and connected to said heating element, and with said electrical wires extending outwardly through an opposing end of said flexible conduit, so that said electrical wires are exposed and connectable to said source of electrical power.

8. A liquid warming grommet assembly in accordance with claim 3, characterized in that said power connection means comprises a flexible conduit having electrical wires therein, and having one end connected to said heating element, and an opposing end of said flexible conduit and said electrical wires connected to a multi-port connector.

9. A liquid warming grommet assembly in accordance with claim 3, characterized in that said grommet assembly further comprises a plurality of latching cam assemblies mounted to said casing and adapted to selectively secure said casing to said work table or other furniture item.

10. A liquid warming grommet assembly in accordance with claim 9, characterized in that said each of said latching cam assemblies comprises:

a cylindrical bushing vertical oriented and integrally coupled with or otherwise secured to an inner surface of said casing, said bushing comprising a vertically disposed cylindrical aperture, said cylindrical aperture having a first cylindrical portion with a diameter sufficient so as to receive a head of a threaded screw, in a countersunk configuration.

11. A liquid warming grommet assembly in accordance with claim 10, characterized in that each of said latching cam assemblies further comprises:

a cam element having an upstanding sleeve portion and a horizontally disposed foot integrally formed with or otherwise secured to a lower end of said upstanding sleeve portion, a threaded aperture extending at least partially through said upstanding sleeve portion and adapted to threadably receive said threaded screw; and said horizontally disposed foot comprising a leg extending from an underside of said upstanding sleeve portion, and a boss projecting upwardly from a distal section of said leg.

12. A liquid warming grommet assembly in accordance with claim 3, characterized in that said heating element is sized and configured so as to comprise a finger slot cut out of said warmer plate directly above said power switch.

\* \* \* \* \*